United States Patent
Lin et al.

(10) Patent No.: US 12,120,472 B2
(45) Date of Patent: Oct. 15, 2024

(54) HIGH SENSITIVITY COLOR IMAGE GENERATION USING HYBRID SENSOR

(71) Applicant: MediaTek Inc., Hsinchu (TW)

(72) Inventors: Yu-Ju Lin, Hsinchu (TW); Ying-Jui Chen, Hsinchu (TW); Keh-Tsong Li, Hsinchu (TW); Pin-Chung Lin, Hsinchu (TW); Hung-Chih Ko, Hsinchu (TW); Chi-Cheng Ju, Hsinchu (TW)

( * ) Notice: Subject to any disclaimer, the term of this patent is extended or adjusted under 35 U.S.C. 154(b) by 311 days.

(21) Appl. No.: 17/691,043

(22) Filed: Mar. 9, 2022

(65) Prior Publication Data

US 2022/0303515 A1 Sep. 22, 2022

Related U.S. Application Data

(60) Provisional application No. 63/162,091, filed on Mar. 17, 2021.

(51) Int. Cl.
  *H04N 9/64* (2023.01)
  *H04N 5/30* (2006.01)
  *H04N 23/10* (2023.01)

(52) U.S. Cl.
  CPC .............. *H04N 9/646* (2013.01); *H04N 5/30* (2013.01); *H04N 23/10* (2023.01)

(58) Field of Classification Search
  CPC ........ H04N 5/30; H04N 23/10; H04N 25/133; H04N 9/646; G06T 11/001; G06T 15/80
  See application file for complete search history.

(56) References Cited

U.S. PATENT DOCUMENTS

| | | | |
|---|---|---|---|
| 6,690,422 B1 | 2/2004 | Daly et al. | |
| 2003/0112353 A1* | 6/2003 | Morris | H04N 25/131 348/222.1 |
| 2004/0090550 A1 | 5/2004 | Park | |

(Continued)

FOREIGN PATENT DOCUMENTS

| | | |
|---|---|---|
| CN | 102316328 A | 1/2012 |
| CN | 104581100 A | 4/2015 |

(Continued)

OTHER PUBLICATIONS

Taiwan Intellectual Property Office, Office Action for Taiwan Patent Application No. 111109590, Aug. 29, 2022.

(Continued)

*Primary Examiner* — Twyler L Haskins
*Assistant Examiner* — John H Morehead, III
(74) *Attorney, Agent, or Firm* — Andy M. Han (57) ABSTRACT

Various schemes pertaining to generating a full-frame color image using a hybrid sensor are described. An apparatus receives sensor data from the hybrid sensor, wherein the sensor data includes partial-frame chromatic data of a plurality of chromatic channels and partial-frame color-insensitive data. The apparatus subsequently generates full-frame color-insensitive data based on the partial-frame color-insensitive data. The apparatus subsequently generates the full-frame color image based on the full-frame color-insensitive data and the partial-frame chromatic data. The apparatus provides benefits of enhancing image quality of the full-frame color image especially under low light conditions.

18 Claims, 8 Drawing Sheets

(56) References Cited

U.S. PATENT DOCUMENTS

| | | | | |
|---|---|---|---|---|
| 2007/0183657 A1* | 8/2007 | Kidono | ............... | H04N 25/131 |
| | | | | 382/162 |
| 2008/0130991 A1* | 6/2008 | O'Brien | ............... | H04N 25/135 |
| | | | | 348/E5.041 |
| 2008/0131028 A1* | 6/2008 | Pillman | ............... | H04N 25/133 |
| | | | | 348/E5.041 |
| 2010/0232692 A1* | 9/2010 | Kumar | ............... | H04N 23/843 |
| | | | | 348/208.4 |
| 2010/0289885 A1* | 11/2010 | Lu | ............... | H04N 25/135 |
| | | | | 348/61 |
| 2011/0013056 A1* | 1/2011 | Myhrvold | ............... | H04N 25/135 |
| | | | | 348/E5.045 |
| 2011/0050918 A1* | 3/2011 | Tachi | ............... | H04N 23/68 |
| | | | | 348/208.4 |
| 2016/0080706 A1* | 3/2016 | Kaiser | ............... | H04N 25/131 |
| | | | | 348/280 |
| 2017/0270381 A1* | 9/2017 | Itoh | ............... | G06V 20/588 |
| 2017/0374299 A1 | 12/2017 | Liu et al. | | |
| 2018/0131880 A1 | 5/2018 | Hicks et al. | | |
| 2020/0351460 A1 | 11/2020 | Cote et al. | | |
| 2020/0366843 A1* | 11/2020 | Kobashiri | ............ | H04N 1/3871 |
| 2021/0281778 A1* | 9/2021 | Sugizaki | ............ | H04N 25/133 |

FOREIGN PATENT DOCUMENTS

| | | |
|---|---|---|
| CN | 110463197 A | 11/2019 |
| CN | 110637459 A | 12/2019 |
| CN | 111194458 A | 5/2020 |

OTHER PUBLICATIONS

China National Intellectual Property Administration, First Office Action in China Patent Application No. 202210254505.5, Jan. 5, 2024.

Taiwan Intellectual Property Office, Office Action for Taiwan Patent Application No. 111109590, Apr. 17, 2023.

* cited by examiner

HIGH SENSITIVITY COLOR IMAGE GENERATION USING HYBRID SENSOR

CROSS REFERENCE TO RELATED PATENT APPLICATION

The present disclosure is part of a non-provisional patent application claiming the priority benefit of U.S. Provisional Patent Application No. 63/162,091, filed on 17 Mar. 2021, the content of which being incorporated by reference in its entirety.

TECHNICAL FIELD

The present disclosure is generally related to image processing and, more particularly, to methods and apparatus for generating high sensitivity color images using data captured by a hybrid sensor.

BACKGROUND

Unless otherwise indicated herein, approaches described in this section are not prior art to the claims listed below and are not admitted as prior art by inclusion in this section.

Human obtains sight vision by receiving light signals with retina of our eyes. The retina is a thin layer located on the back side of an eye, and has numerous photoreceptors located thereon. In analogy, the retina as to the eye is like a film as to a camera. There are two types of photoreceptors in a human eye, namely, rod cells and cone cells. Rod cells are very sensitive to the light received, as they are able to sense a very small amount of light. That is, a light having energy of only a few photons is enough to activate a rod cell, which in turn sends an electric signal to human brain as an indication of receiving the light. However, rod cells do not discern the color of the light. That is, rod cells are non-chromatic photoreceptors, and human brain would not perceive the color of the light with the electric signal sent from rod cells. On the contrary, cone cells are chromatic photoreceptors. That is, cone cells are able to generate an electric signal that tells the brain what color of the received light it is, so that the brain is able to perceive color properties of objects such as hue and saturation. There are three kinds of cone cells on the retina, able to sense a light of red, green, and blue, respectively. The three colors, i.e., red, green and blue, form a color model, based on which any other color perceivable by human eyes can be represented as a combination of the three colors in a specific proportion or ratio in intensity. Accordingly, the three kinds of cone cells enable the brain to perceive a full spectrum of visible colors. Nevertheless, it takes far more photonic energy to activate a cone cell as compared to the few photons needed to activate a rod cell. Therefore, in a low light environment where ambient light is dim or lacking, it is more likely that the rod cells would stay activated (i.e., sending corresponding electric signals to the brain) while the cone cells are mostly inactive (i.e., not sending electric signals to the brain). The brain would thus perceive the light signals received by the retina as more of a gray-scale image, as the electric signal from the cone cells are weak. It follows that it is hard for human eyes to tell the color of an object under a low light condition, even though the shape, outline, and/or shadow of the object may still be identified or perceived.

In addition to the different functions of sensing the incoming light (i.e., discerning colors or not), rod cells and cone cells are also different in terms of their quantities on the retina. In general, the retina of the human eye has more than a hundred million of rod cells, whereas only about six million of cone cells exist thereon. This is another reason why under low light conditions shapes and outlines as well as darkness and shadows can be identified or otherwise perceived better than the colors by human eyes.

Instead of using a film to mimic the retina, contemporary digital image capturing devices, such as digital still cameras, digital camcorders, cell phone cameras, surveillance cameras, etc., capture images of the real world using a sensor array having a plurality of sensing elements, or pixel sensors, that are able to sense or otherwise detect colors. Similar to how the retina has three kinds of cone cells, the sensor array also includes different kinds of sensing elements for sensing corresponding colors of a color model. For example, a typical sensor array of a digital camera may include a first group of sensing elements configured to sense the red light, a second group of sensing elements configured to sense the green light, and a third group of sensing elements configured to sense the blue light. However, unlike the retina of human eyes that has rod cells thereon, the sensor array lacks sensing elements that are suitable for low light conditions. As a consequence, low light conditions become a limiting factor for digital image capturing devices employing such a sensor array, and the resulted images under low light conditions end up lacking details, exhibiting unsatisfactory clarity and contrast.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to generating high-sensitivity color images using a hybrid sensor. It is believed that with the various embodiments in the present disclosure, benefits including enhanced image quality especially under low light conditions, a lower image noise level, and/or reduced hardware overhead are achieved.

In one aspect, a method is presented for generating a full-frame color image using sensor data from a hybrid sensor, wherein the hybrid sensor employs a sensor array having a plurality of chromatic sensing elements and a plurality of non-chromatic sensing elements co-located on the sensor array. The method may involve receiving sensor data from the hybrid sensor, wherein the sensor data includes partial-frame chromatic data of a plurality of chromatic channels and partial-frame color-insensitive data. In some embodiments, the partial-frame chromatic data is generated by the chromatic sensing elements of the sensor array, whereas the partial-frame color-insensitive data is generated by the non-chromatic sensing elements of the sensor array. The sensor array may have more non-chromatic sensing elements than the chromatic sensing elements. The method may also involve generating full-frame color-insensitive data based on the partial-frame color-insensitive data. The method may further involves generating the full-frame color image based on the full-frame color-insensitive data and the partial-frame chromatic data.

In another aspect, an apparatus is presented which comprises an input module, a spatial filtering module, and a colorization module. The input module is configured to receive sensor data from a hybrid sensor, wherein the hybrid sensor employs a sensor array having a plurality of chromatic sensing elements and a plurality of non-chromatic sensing elements co-located on the sensor array. The sensor data includes partial-frame chromatic data of a plurality of chromatic channels and partial-frame color-insensitive data. In some embodiments, the partial-frame chromatic data is generated by the chromatic sensing elements of the sensor array, whereas the partial-frame color-insensitive data is generated by the non-chromatic sensing elements of the sensor array. The spatial filtering module is configured to generate full-frame color-insensitive data based on the partial-frame color-insensitive data. The colorization module is configured to generate a plurality of full-frame chromatic images based on the full-frame color-insensitive data and the partial-frame chromatic data. Each of the full-frame chromatic images is corresponding to a respective one of the plurality of chromatic channels.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Implementations in accordance with the present disclosure relate to various techniques, methods, schemes and/or solutions pertaining to encoding a video with motion compensated temporal filtering (MCTF) pre-encoding processing. According to the present disclosure, a number of possible solutions may be implemented separately or jointly. That is, although these possible solutions may be described below separately, two or more of these possible solutions may be implemented in one combination or another.

I. Hybrid Sensor

As described above, existing image sensors include only chromatic sensing elements for sensing or otherwise detecting chromatic components of real-world objects but lack non-chromatic sensing elements suitable for detecting the objects under low ambient light conditions. In the analogy of human eyes, an image sensor lacking non-chromatic sensing elements is like a retina having only cone cells but without rod cells. Accordingly, the ability of such image sensors for capture images under low light conditions is greatly limited. For example, when capturing an image under low light conditions, such image sensors would result in an image having many "noisy points", as the amount of incident light allowed to reach the sensing elements of the image sensors would be close to the noise floor of the image sensors.

Figure 1:
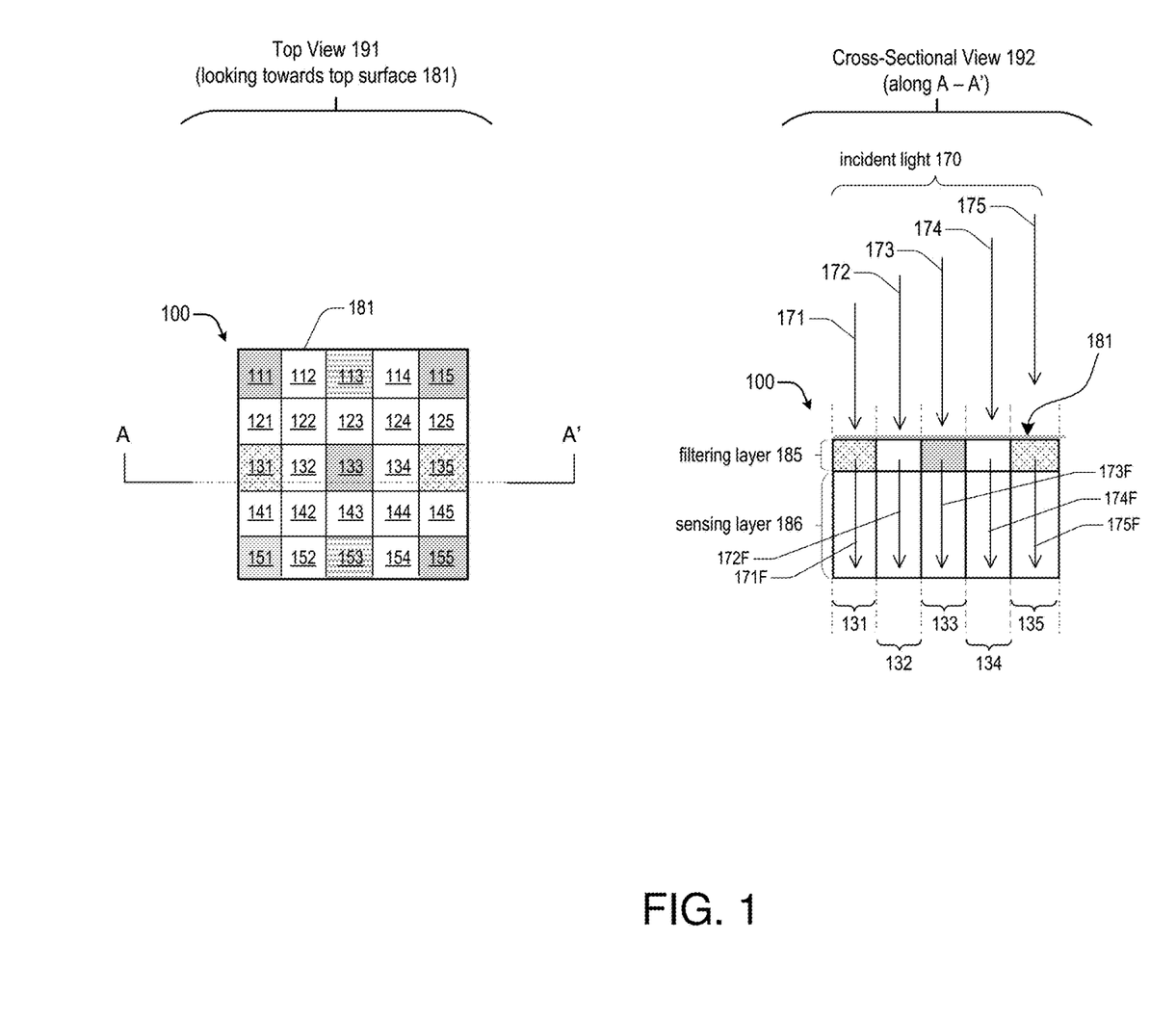
FIG. 1 is a diagram of an example design in accordance with an implementation of the present disclosure.

To enhance the poor sensitivity of image sensors under low light conditions, the present disclosure advocates employment of a hybrid sensor (i.e., a hybrid image sensor) that is able to mimic the retina of human eyes. The proposed hybrid sensor has non-chromatic sensing elements (for mimicking the rod cells of the retina) in addition to chromatic sensing elements (for mimicking the cone cells of the retina), wherein both types of sensing elements are co-located in a sensor array of the hybrid sensor. The hybrid sensor may further include interface optics (e.g., optics for guiding incoming light signals to arrive at the sensor array) and/or interface electronics (e.g., readout circuit capable of reading or otherwise relaying electric signals generated by the sensor array to an external device for display or further processing). FIG. 1 is a diagram of an example design in accordance with an implementation of the present disclosure, wherein a sensor array 100 of a hybrid sensor is shown. The sensor array 100 is configured to receive incident light 170 with a top surface 181 of the sensor array 100, wherein the incident light 170 is reflected and/or radiated from real-world objects of which the hybrid sensor is trying to capture an image. The top surface 181 of the sensor array 100 is shown in a top view 191 of FIG. 1.

The sensor array 100 comprises a plurality of sensing elements, sometimes called "sensing pixels" or "pixel sensors", that are formed into an array or a matrix. The plurality of sensing elements of the sensor array 100 is shown in the top view 191, including sensing elements 111, 112, 113, 114, 115, 121, 122, 123, 124, 125, 131, 132, 133, 134, 135, 141, 142, 143, 144, 145, 151, 152, 153, 154 and 155. Each of the plurality of sensing elements of the sensor array 100 is either a chromatic sensing element or a non-chromatic sensing element. Each chromatic sensing element is configured to generate pixel data (e.g., an electric signal) that represents a chromatic component (i.e., a specific hue of color) of the incident light 170 as received by the chromatic sensing element, whereas each non-chromatic sensing element is configured to generate pixel data (e.g., an electric signal) that represents a luminance component (i.e., a specific shade of light) of the incident light 170 as received by the non-chromatic sensing element. Specifically, among the plurality of sensing elements shown in the top view 191, the sensing elements 111, 113, 115, 131, 133, 135, 151, 153 and 155 are chromatic sensing elements, whereas the rest of the sensing elements are non-chromatic sensing elements.

Also shown in FIG. 1 is a cross-sectional view 192 of the sensor array 100. Specifically, the cross-sectional view 192 shows a cross section A-A' of the sensor array 100 as shown in the top view 191. As illustrated in the cross-sectional view 192, the sensor array 100 comprises a filtering layer 185 and a sensing layer 186 that are disposed on top of one another. Each of the filtering layer 185 and the sensing layer 186 extends along a plane that is substantially parallel to the light-receiving surface 181 (i.e., the top surface 181) of the sensor array 100. That is, each sensing element has a top portion located in the filtering layer 185 and a bottom portion located in the sensing layer 186. The distinction between a chromatic sensing element and non-chromatic sensing element resides in the filtering portion (i.e., the top portion) rather than the sensing portion (i.e., the bottom portion). The top portion functions as an optical filter, which allows optical components within a specific band of wavelength to pass through and reach the bottom portion while rejecting optical components outside the specific band of wavelength. The bottom portion of each sensing element, chromatic and non-chromatic alike, performs a same function of optical-to-electrical conversion, i.e., converting the optical components allowed to pass through the top portion into a corresponding electrical signal that represents the intensity of the passing-through optical components. The sensing layer 186 may comprise an array of photodetectors realized by charged coupled device (CCD) or complementary metal-oxide semiconductor (CMOS) technologies.

Any visible color can be synthesized or represented using primary colors of a color model. A widely utilized color model is the RGB color model, wherein the primary colors thereof are red, green, and blue. Another widely utilized color model is the CMY color model, wherein the primary colors thereof are cyan, magenta, and yellow. A chromatic sensing element has a top portion that allows optical components within a narrow band around a primary color of a color model to pass through, while rejecting optical components outside the narrow band. The narrow band around a primary color is often referred to as a "chromatic channel". For a sensor array employing a specific color model, the chromatic sensing elements of the sensor array would allow only optical components within the chromatic channels of the color model to pass through. Using the RGB color model as an example. The sensor array 100 may employ the RGB color model, and each of the chromatic sensing elements 111, 113, 115, 131, 133, 135, 151, 153 and 155 may allow optical components of the incident light 170 that are within one of the three chromatic channels of the RGB color model (i.e., the red channel, the green channel, and the blue channel) to pass through the filtering portion (i.e., the top portion in the filtering layer 185) of the respective chromatic sensing element. Likewise, in an event that the CMY color model is employed, each of the chromatic sensing elements 111, 113, 115, 131, 133, 135, 151, 153 and 155 may sense optical components of the incident light 170 that are within a cyan channel, a magenta channel, or a yellow channel.

A chromatic sensing element that allows optical components within the red channel to pass through is referred to as a red channel pixel sensor. A chromatic sensing element that allows optical components within the green channel to pass through is referred to as a green channel pixel sensor. A chromatic sensing element that allows optical components within the blue channel to pass through is referred to as a blue channel pixel sensor. In some embodiments, the sensor array 100 may employ the RGB color model, and the plurality of chromatic sensing elements of the sensor array 100 may include red channel pixel sensors 131 and 135, blue channel pixel sensors 113 and 153, as well as green channel pixel sensors 111, 115, 133, 151 and 155. As shown in the cross-sectional view 192, the green channel pixel sensor 133 may receive a portion 173 of the incident light 170. The top portion of the pixel sensor 133 may allow only optical components of the portion 173 that are within the green channel, represented by an optical signal 173F of FIG. 1, to pass through and reach the bottom portion of the pixel sensor 133. Similarly, the red channel pixel sensors 131 and 135 may respectively receive a portion 171 and a portion 175 of the incident light 170, and the pixel sensors 131 and 135 may respectively allow optical components 171F and 175F that are within the red channel of the RGB color model to pass through.

As mentioned above, the sensor array 100 also includes a plurality of non-chromatic sensing elements, i.e., the sensing elements 112, 114, 121-125, 132, 134, 141-145, 152 and 154. Since the non-chromatic sensing elements are intended to mimic the rod cells of human retina, the non-chromatic sensing elements may be configured to allow the incident light 170 to pass through the filtering layer 185 with minimum diminishing or biasing towards certain wavelength bands, so that most if not all optical energy of the incident light 170 can be sensed by the sensing layer 186. For example, each of the pixel sensors 132 and 134 is a non-chromatic sensing element, and the top portion of each of the pixel sensors 132 and 134 is configured to provide little or no rejection of the incident light 170. That is, optical components 172F and 174F as shown in the cross-sectional view 192 respectively preserve most optical energy within the visible light range in a portion 172 and a portion 174 of the incident light 170, which are received at the pixel sensors 132 and 134, respectively. As the non-chromatic sensing elements of the sensor array 100 are configured to receive most optical components of the incident light 170 within the visible light range, the non-chromatic sensing elements are often referred to as "white light pixel sensors", or simply "white light sensors".

In some embodiments, the filtering layer 185 may be configured such that not only optical components within the visible light range, but also optical components in the infrared range adjacent to the visible light range, such as those within the near infrared (NIR) band (e.g., wavelength around or longer than 850 nanometer), may pass through the filtering layer 185 of the non-chromatic sensing elements. The inclusion of the NIR band further increases the amount of optical energy reaching the sensing layer 186 of the non-chromatic sensing elements, thereby enhancing the sensitivity of the luminance component of the incident light 170 especially under low light conditions. A non-chromatic sensing element capable of sensing NIR components in addition to visible light components is referred to as a "NIR sensor" or an "IR sensor".

Figure 2:
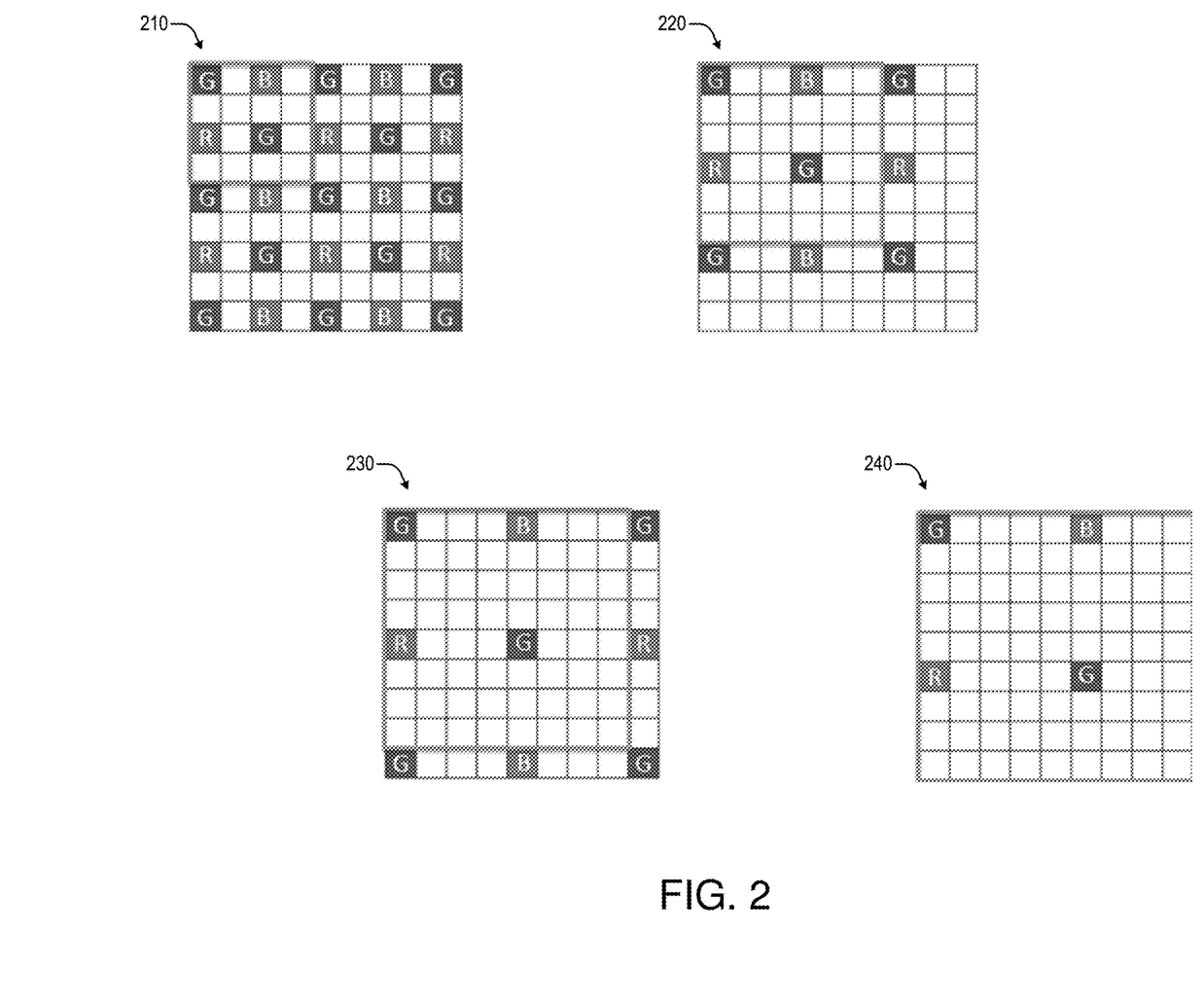
FIG. 2 is a diagram of an example design in accordance with an implementation of the present disclosure.

As described elsewhere herein above, a configuration of the filtering layer 185 determines how the chromatic and non-chromatic sensing elements of the sensor array 100 are distributed or otherwise arranged. The arrangement of the chromatic and non-chromatic sensing elements may be represented by a top view of the filtering layer 185, wherein the top view is often referred to as a "Bayer pattern". FIG. 2 is a diagram of an example design in accordance with an implementation of the present disclosure, wherein several Bayer patterns 210, 220, 230 and 240 are shown. Each of the Bayer patterns 210, 220, 230 and 240 may be employed by the filtering layer 185 of a hybrid sensor. In FIG. 2, each blank block represents a non-chromatic sensing element, and each shaded block represents a chromatic sensing element. The Bayer patterns of FIG. 2 are presented using the RGB color model as an example, but the design is applicable to other color models and not limited to the RGB color model. Similar to how the quantity of the rod cells in human retina is larger than the quantity of the cone cells, in each of the Bayer patterns 210, 220, 230 and 240, the non-chromatic sensing elements have a quantity that is greater than the quantity of the chromatic sensing elements. Specifically, the non-chromatic sensing elements and the chromatic sensing elements have a quantity ratio of 3:1, 8:1, 15:1 and 24:1 in the Bayer patterns 210, 220, 230 and 240, respectively. A higher quantity ratio provides a higher luminance sensitivity especially under low light conditions, which translates to enhanced quality of images generated using the hybrid sensor, at the expense of a sparser chromatic data that can be generated. An optimal quantity ratio may be found and shall depend on specific applications. Our experiment result indicates that a quantity ratio as high as 63:1 is still feasible for generating a high quality full-frame color image using processes that are disclosed in detail elsewhere herein below.

Moreover, it is to be noted that the chromatic sensing elements are arranged to be sparsely distributed among the non-chromatic sensing elements in each of the Bayer patterns 210, 220, 230 and 240. That is, the chromatic sensing elements are sparsely distributed among the non-chromatic sensing elements across the top surface 181, i.e., the light-receiving surface of the sensor array 100. In some embodiments, the chromatic sensing elements are uniformly distributed among the non-chromatic sensing elements across the top surface 181.

II. Full-Frame Color Image Generation Using Colorization

Figure 3:
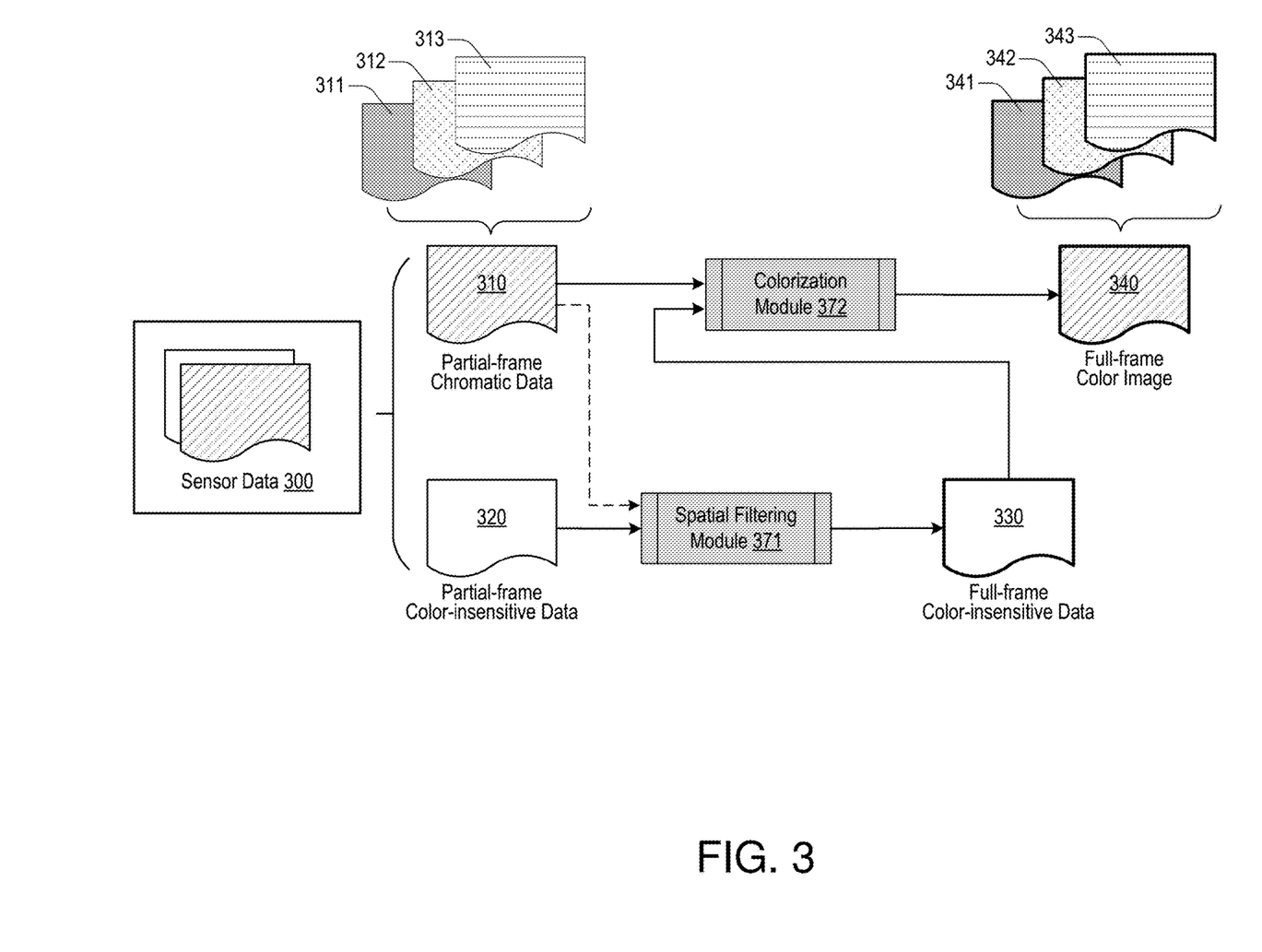
FIG. 3 is a diagram of an example design in accordance with an implementation of the present disclosure.

FIG. 3 is a diagram of an example data flow in accordance with an implementation of the present disclosure, wherein a full-frame color image 340 is generated using sensor data 300 detected and provided by a hybrid sensor. By the term "full-frame", in some embodiments, every pixel of the color image 340 may contain data. In some embodiment, however, the full-frame color image 340 may not have data at each and every pixel of the frame. Rather, the full-frame color image 340 may be an uncompressed or compressed image that contains data at not all but sufficiently many pixels of the frame, such as contemporary YUV420 or YUV422 format, among others. The hybrid sensor that provides the sensor data 300 may employ a sensor array such as the sensor array 100. The full-frame color image 340 comprises a plurality of full-frame chromatic images, such as images 341, 342 and 343. Each of the full-frame chromatic images 341, 342 and 343 corresponds to a respective one of the plurality of chromatic channels of the color model that the sensor array employs. For example, in an event that the sensor data 300 is generated from a sensor array that employs the RGB color model, each of the images 341, 342 and 343 corresponds to one of the chromatic channels of the primary colors of the RGB color model. For example, the full-frame chromatic images 341, 342 and 343 may correspond to the green, red and blue chromatic channels, respectively.

As shown in FIG. 3, the sensor data 300 includes partial-frame chromatic data 310 and partial-frame color-insensitive data 320. Specifically, the partial-frame chromatic data 310 is generated by the chromatic sensing elements of the hybrid sensor, such as the chromatic sensing elements 111, 113, 115, 131, 133, 135, 151, 153 and 155 of the sensor array 100, or the chromatic sensing elements indicated in each of the Bayer patterns 210, 220, 230 and 240. Since the chromatic sensing elements are sparsely distributed over the Bayer patterns, the resulted chromatic data 310 is of the nature of "partial-frame", which means that the chromatic data 310 does not have data at every pixel location of the sensor array. For example, the chromatic data 310 generated by the chromatic sensing elements of the sensor array 100 would have values only at pixel locations of the chromatic sensing elements 111, 113, 115, 131, 133, 135, 151, 153 and 155, and would not have values at pixel locations of the non-chromatic sensing elements 112, 114, 121-125, 132, 134, 141-145, 152 and 154.

The partial-frame chromatic data 310 may be represented by a plurality of partial-frame chromatic images, such as images 311, 312 and 313. Each of the partial-frame chromatic images 311, 312 and 313 corresponds to a respective one of the plurality of chromatic channels of the color model that the sensor array employs. For example, in an event that the sensor data 300 is generated from the sensor array 100 that employs the RGB color model, each of the images 311, 312 and 313 corresponds to one of the chromatic channels of the primary colors of the RGB color model. For example, the partial-frame chromatic images 311, 312 and 313 may correspond to the green, red and blue chromatic channels, respectively. Specifically, the partial-frame chromatic image 311 may be generated by the green channel sensing elements 111, 115, 133, 151 and 155, the partial-frame chromatic image 312 by the red channel sensing elements 131 and 135, and the partial-frame chromatic image 313 by the blue channel sensing elements 113 and 153.

Similar to the chromatic data 310, the color-insensitive data 320 is also of the "partial-frame" nature, as the color-insensitive data 320 is generated by the non-chromatic sensing elements of the hybrid sensor, such as the non-chromatic sensing elements 112, 114, 121-125, 132, 134, 141-145, 152 and 154 of the sensor array 100, or the non-chromatic sensing elements indicated in each of the Bayer patterns 210, 220, 230 and 240. Therefore, the chromatic data 310 and the color-insensitive data 320 may be complimentary to one another in terms of pixel locations that have values. Given that the quantity of the non-chromatic sensing elements is greater than that of the chromatic sensing elements in a sensor array according to embodiments of the present disclosure, the color-insensitive data 320 is a "fuller" frame, in terms of the whole frame of the sensor array, as compared to the partial-frame chromatic data 310. As described above, the partial-frame color-insensitive data 320 represents the luminance component of the sensor data 300, whereas the partial-frame chromatic data 310 represents the chromatic component of the sensor data 300.

As shown in the data flow diagram of FIG. 3, a spatial filtering module 371 takes the partial-frame color-insensitive data 320 as an input and outputs a full-frame color-insensitive data 330. That is, based on the partial-frame color-insensitive data 320, the spatial filtering module 371 fills values in the pixel locations corresponding to the chromatic sensing elements, which contain no data in the partial-frame color-insensitive data 320. In some embodiments, the spatial filtering module 371 may determine the values to fill with by performing a spatial filtering process, e.g., by interpolating a certain number of pixel values of the partial-frame color-insensitive data 320. For example, in determining a pixel value of the full-frame color-insensitive data 330 for the pixel location corresponding to the chromatic sensing element 133, the spatial filtering module 371 may perform interpolation with pixel values of the partial-frame color-insensitive data 320 at pixel locations corresponding to the non-chromatic sensing elements around the chromatic sensing element 133, such as pixel locations corresponding to the non-chromatic sensing elements 123, 132, 134, and 143. Alternatively or additionally, pixel values at locations corresponding to other non-chromatic sensing elements around the chromatic sensing element 133, such as one or more of the non-chromatic sensing elements 122, 124, 142 and 144, may also be referenced in the spatial filtering process performed by the spatial filtering module 371.

In some embodiments, in addition to taking the partial-frame color-insensitive data 320 as an input, the spatial filtering module 371 may further utilize the partial-frame chromatic data 310 in generating the full-frame color-insensitive data 330. That is, one or more of the partial-frame chromatic images 311, 312 and 313 may be referenced by the spatial filtering module 371 in performing the spatial filtering process. For example, the chromatic data sensed by the chromatic sensing element 133 may also be utilized in determining the missing luminance value at that pixel location, especially when the ambient light is abundant. In general, the partial-frame chromatic data 310 and the partial-frame non-chromatic data 320 are utilized in spatial filtering module 371. The missing non-chromatic pixels take relatively small portion in spatial domain, such that their content may be highly correlated to the neighboring pixels. The spatial filtering module 371 may accordingly compensate for these missing values via means such as but not limited to various pixel interpolation methods (e.g., nearest neighbor, bilinear or bicubic interpolation methods), edge preserving filters (e.g., bilateral filters or guided filters) or other non-linear filters.

The color-insensitive data 320 and 330 are sometimes called "white channel data". This is because white light encompasses all components of visible light and thus is color insensitive. The partial-frame color-insensitive data 320 may be referred to as "partial-frame white channel data", whereas the full-frame color-insensitive data 330 as "full-frame white channel data". Additionally, the full-frame color-insensitive data 330 may also be called a "gray image", as the luminance information contained therein is often visually presented as a gray-scale image.

As shown in the data flow diagram of FIG. 3, the full-frame color image 340 is generated by a colorization module 372 based on the partial-frame chromatic data 310 as well as the full-frame color-insensitive data 330. Specifically, colorization module 372 performs a colorization process that generates the full-frame chromatic components 341, 342 and 343 of the full-frame color image 340 by coloring the full-frame color-insensitive data 330 with chromatic information contained in the partial-frame chromatic images 311, 312 and 313, respectively. More specifically, the chromatic information contained in the partial-frame chromatic images 311, 312 and 313 are used as color scribbles, or paint brushes, with which the colorization module 372 colors the full-frame color-insensitive data 330 through the colorization process to generate the full-frame chromatic images 341, 342 and 343, respectively. An example of colorization is given in FIG. 4 and described in detail below.

Figure 4:
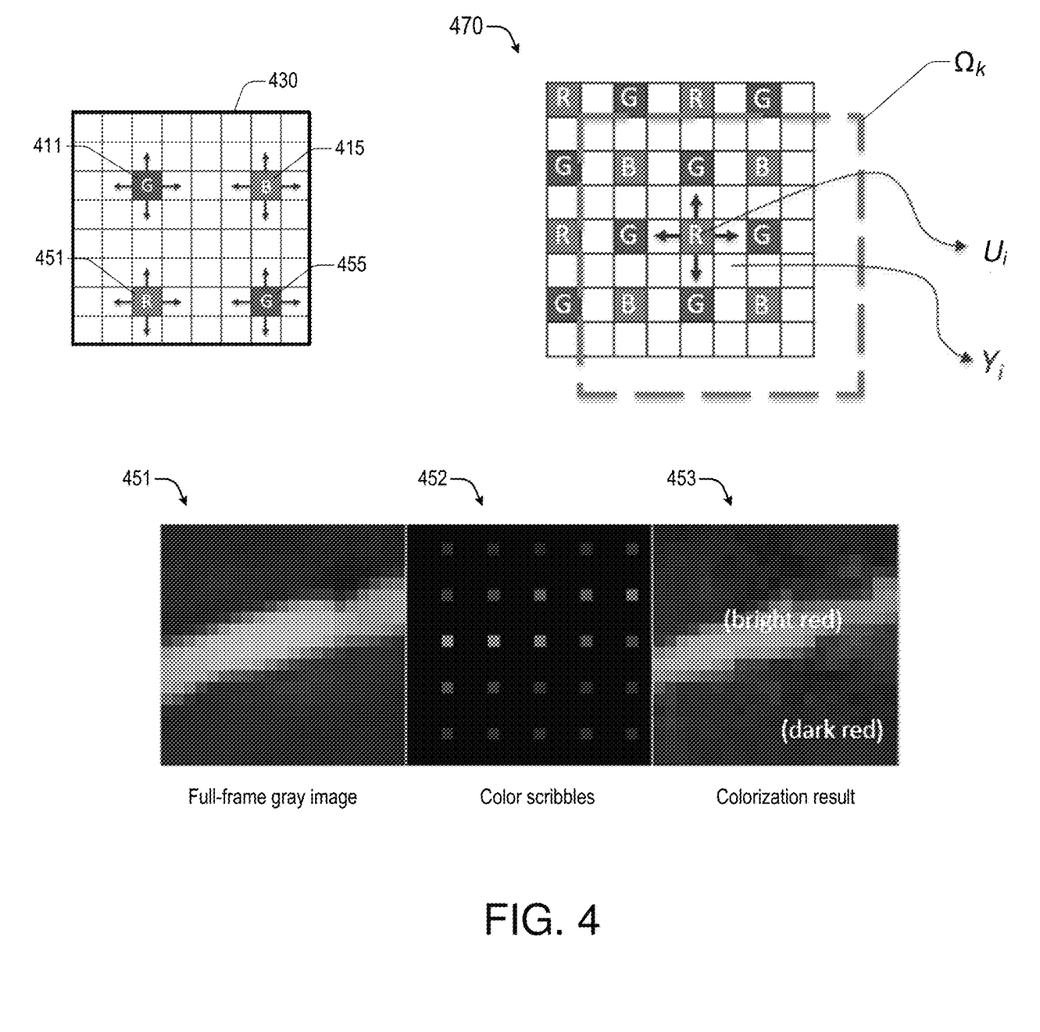
FIG. 4 is a diagram of an example design in accordance with an implementation of the present disclosure.

FIG. 4 is a diagram of an example design in accordance with an implementation of the present disclosure, wherein an aspect of the colorization process is illustrated. The colorization module 372 may use pixel values of the partial-frame chromatic data 310 as color scribbles to color the full-frame color-insensitive data, or the gray image, 330 for generating the full-frame chromatic images 341, 342 and 343. As shown in FIG. 4, shaded pixels 411, 415, 451 and 455 may represent a few of the color scribbles used by the colorization module 372 to color the gray image 330, a portion of which is represented by white channel data 430. As indicated by the arrows in FIG. 4, each of the color scribbles may be used to color a neighboring area of the gray image 330 around the color scribble, as well as the pixel where the respective color scribble is located.

FIG. 4 also shows examples of the input and output of the colorization module 372 as the colorization module 372 performs the colorization process for one of the chromatic channels of the color model employed, in this case, the red channel. Specifically, the input includes an image 451 (i.e., an example image representing the full-frame color-insensitive data 330) and a plurality of color scribbles 452 (i.e., an example image representing the red channel 312 of the partial-frame chromatic data 310). The output, which is the colorization result, is represented by a full-frame chromatic image 453 of the red channel (i.e., an example image representing the red channel image 342 of the full-frame color image 340). Namely, the colorization module 372 utilizes color scribbles 452 to color the gray image 451 into the chromatic image 453. The colorization module 372 performs the colorization process for each of the chromatic channels of the color model to generate full-frame chromatic images 341, 342 and 343, which may be collectively displayed or transmitted as the full-frame color image 340.

In some embodiments, the color scribbles 452 may be related to the colorization result 453 through a substantially linear equation. For example, the colorization process performed by the colorization module 372 may involve applying the partial-frame chromatic data 310 to the full-frame color-insensitive data 330 using a substantially linear function that establishes the relation described or otherwise defined by the equation. As a consequence, the partial-frame chromatic images 311, 312 and 313 are respectively related to the full-frame chromatic images 341, 342 and 343 through the equation. The substantially linear function may take the following form:

$$U_i = a_k Y_i + b_k. \quad (1)$$

Referring to illustration 470 of FIG. 4, $U_i$ of the function in Eq. (1) represents a color scribble, manifested in a pixel value of a chromatic channel of the partial-frame chromatic data 310, whereas $Y_i$ of the function in Eq. (1) represents a pixel value of the full-frame color-insensitive data 330. Coefficients $a_k$ and $b_k$ are assumed to remain the same values for pixels within a neighborhood $\Omega_k$ around the color scribble Us. In some embodiments, a dimension of the neighborhood $\Omega_k$ in both the horizontal direction and the vertical direction of the sensor array may be set as at least twice the distance between two adjacent scribbles in the respective directions. In some embodiments, the dimension of the neighborhood $\Omega_k$ may be set as much as four times or more of the distance between two adjacent scribbles. In general, the larger the size of the neighborhood $\Omega_k$, the better the colorization result may be achieved.

In some embodiments, optimal values of the coefficients $a_k$ and $b_k$ may be found using various optimization techniques, such as a guided filter solver or a bilateral solver. In some embodiments, the values of the coefficients $a_k$ and $b_k$ may be found using error matrices such as sum of squared differences (SSD) or sum of absolute differences (SAD) across all pixels of a full-frame chromatic image of the full frame color image 340, such as the full-frame chromatic image 341, 342 or 343. For example, Eq. (2) that follows may be used to find the optimal values of the coefficients $a_k$ and $b_k$ for each neighborhood $\Omega_k$ of the full-frame chromatic image, wherein the optimal values of the coefficients $a_k$ and $b_k$ would minimize $J(U)$.

$$J(U) = \sum_k \left( \min_{a_k, b_k} \sum_{i \in \Omega_k} (U_i - a_k Y_i - b_k)^2 \right). \quad (2)$$

Figure 5:
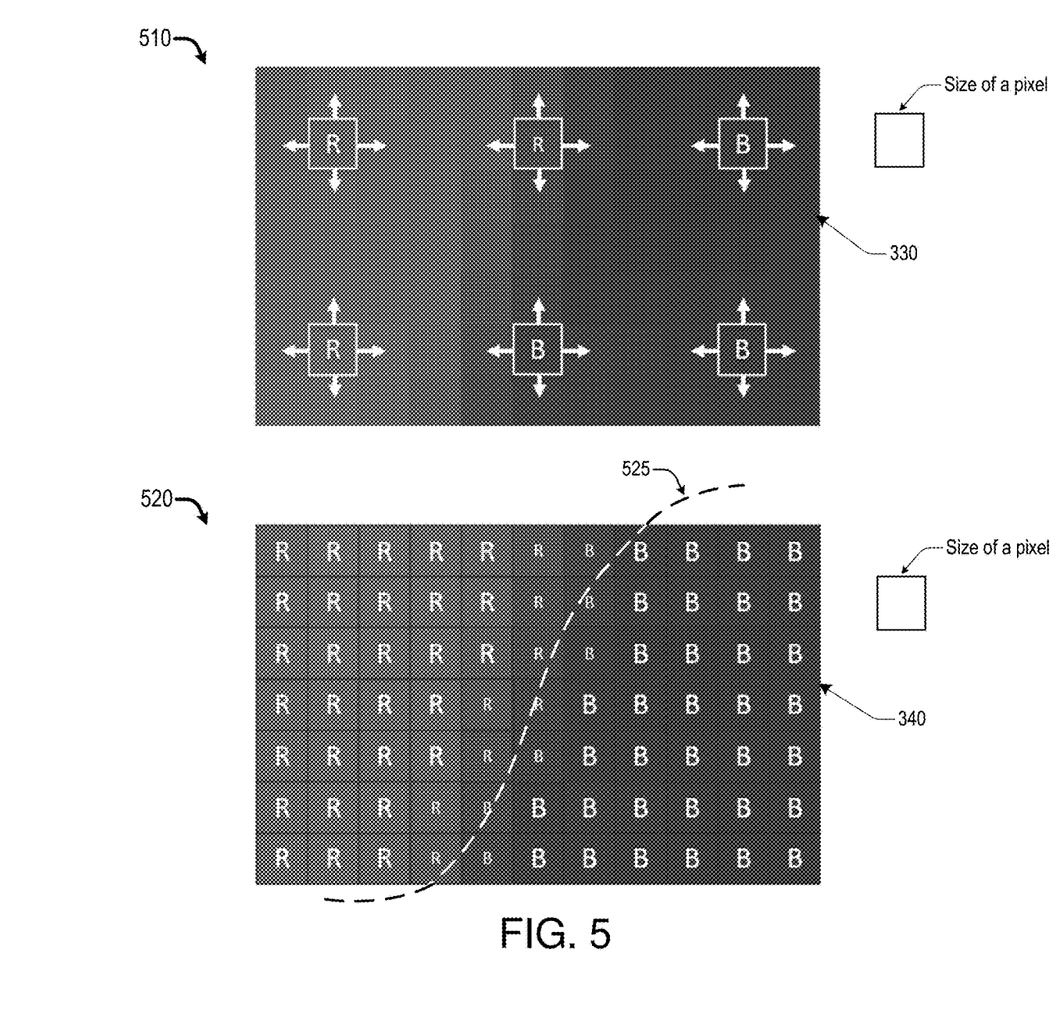
FIG. 5 is a diagram of an example design in accordance with an implementation of the present disclosure.

FIG. 5 is a diagram of an example design in accordance with an implementation of the present disclosure, wherein an advantage of the colorization process described above is illustrated. Specifically, the colorization process advocated in the present disclosure has an advantage of preserving or otherwise retaining edges or boundaries between different primary colors of the color model in the full-frame color image 340. FIG. 5 illustrates the advantage with two diagrams 510 and 520. The diagram 510 illustrates the full-frame gray image 330 overlaid with the partial-frame chromatic data 310. In the diagram 510, the color scribbles are labeled with the letter "R" and the letter "B", wherein the color scribbles labeled with the letter "R" form the partial-frame chromatic image 312 of the red channel, and wherein the color scribbles labeled with the letter "B" form the partial-frame chromatic image 313 of the blue channel. Also in the diagram 510, the shade of darkness at each pixel location of the full-frame gray image 330 represents a luminance value at the pixel location, with a pixel of a darker shade representing a lower level of luminance and a pixel of a lighter shade representing a higher level of luminance. Note that for the specific example illustrated in FIG. 5, the sensor data 300 contains very low values for the green chromatic channel, and thus the partial-frame chromatic image 311 of the green channel is not shown. The letter font size of each of the "R" scribbles and "B" scribbles represents the chromatic pixel value thereof, with a larger font representing a larger pixel value. The diagram 520 illustrates the full-frame color image 340 resulted from the colorization process performed by the colorization module 372, wherein the font size of each of the "R" letter and "B" letter represents the corresponding chromatic pixel value, and wherein the shade of darkness of each pixel represents the corresponding luminance pixel value. The full-frame color image 340 in the diagram 520 clearly shows a boundary 525 between the blue channel and the red channel. Namely, the boundary 525 between the two primary color channels is well maintained in the full-frame color image 340.

III. Illustrative Implementations

Figure 6:
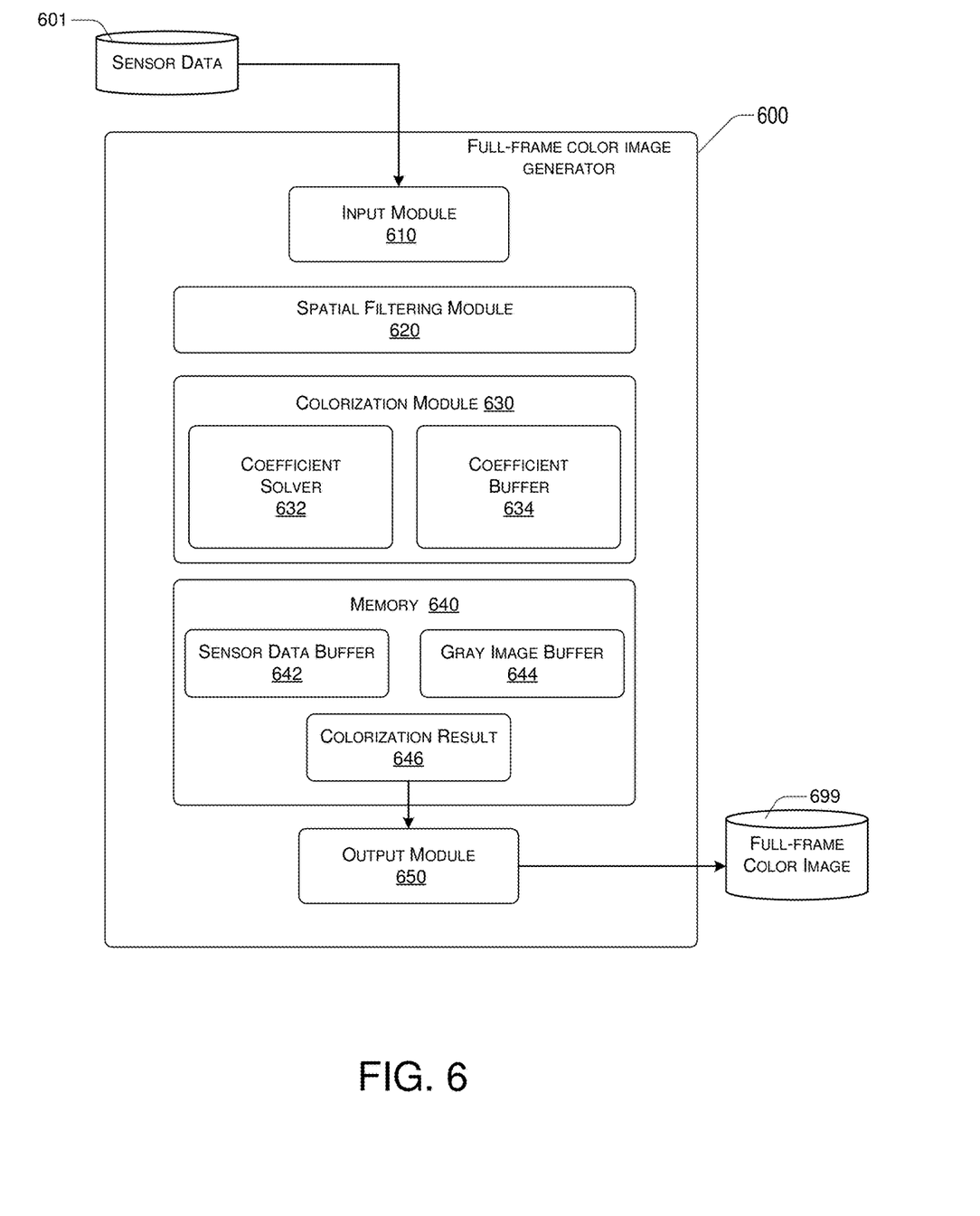
FIG. 6 is a diagram of an example apparatus in accordance with an implementation of the present disclosure.

FIG. 6 illustrates an example apparatus 600 capable of generating a high sensitivity full-frame color image using sensor data obtained from a hybrid sensor. As illustrated, the apparatus 600 receives sensor data 601 that represents real-world objects, and accordingly generates a high sensitivity full-frame color image 699. The sensor data 601 may include data such as the sensor data 300, whereas the full-frame color image 699 may be an embodiment of the full-frame color image 340.

As illustrated, the apparatus 600 has several components or modules for processing the sensor data 601 into the full-frame color image 699, at least including some components selected from an input module 610, a spatial filtering module 620, a colorization module 630, memory 640, and an output module 650. The colorization module 630 may include a coefficient solver 632 and a coefficient buffer 634. The memory 640 may include a sensor data buffer 642 for storing the sensor data 601, as well as a gray image buffer 644 for storing a full-frame gray image generated by the spatial filtering module 620. The memory 640 may further include a buffer 646 for storing results from a colorization process performed by the colorization module 630.

In some embodiments, the modules 610-650 as listed above are modules of software instructions being executed by one or more processing units (e.g., a processor) of a computing device or electronic apparatus. In some embodiments, the modules 610-650 are modules of hardware circuits implemented by one or more integrated circuits (ICs) of an electronic apparatus. Though the modules 610-650 are illustrated as being separate modules, some of the modules can be combined into a single module.

The input module 610 is configured to receive the sensor data 601. The sensor data 601 may be obtained or otherwise captured by a hybrid sensor. The hybrid sensor may employ a hybrid sensor array such as the sensor array 100. The sensor data 601 may include partial-frame chromatic data, such as the partial-frame chromatic data 310, as well as partial-frame color-insensitive data, such as the partial-frame color-insensitive data 320. The partial-frame chromatic data may be generated by a plurality of chromatic sensing elements of the hybrid sensor, such as the chromatic sensing elements 111, 113, 115, 131, 133, 135, 151, 153 and 155. The partial-frame color-insensitive data may be generated by a plurality of non-chromatic sensing elements of the hybrid sensor, such as the non-chromatic sensing elements 112, 114, 121-125, 132, 134, 141-145, 152 and 154. The chromatic sensing elements and the non-chromatic sensing elements are co-located in a sensor array of the hybrid sensor and collectively form an array or a matrix on a light-receiving surface of the sensor array (e.g., the top surface 181 of the sensor array 100). The chromatic sensing elements are arranged to be sparsely distributed among the non-chromatic sensing elements across the light-receiving surface. The non-chromatic sensing elements in the sensor array may have a quantity that is greater than the quantity of the chromatic sensing elements in the sensor array. In some embodiments, the chromatic sensing elements are uniformly distributed among the non-chromatic sensing elements.

The spatial filtering module 620 is configured to process the partial-frame color-insensitive data of the sensor data 601 and accordingly generate full-frame color-insensitive data (e.g., the full-frame gray image 330). The spatial filtering module 620 may embody the spatial filtering module 371. In some embodiments, for generating the full-frame color-insensitive data, the spatial filtering module 620 may further process the partial-frame chromatic data of the sensor data 601. For generating the full-frame color-insensitive data, the spatial filtering module 620 may process the partial-frame color-insensitive data and the partial-frame chromatic data by performing interpolation operations respectively.

The colorization module 630 is configured to generate, by performing a colorization process, colorization result that includes a plurality of full-frame chromatic images (e.g., the full-frame chromatic images 341, 342 and 343) based on the full-frame color-insensitive data generated by the spatial filtering module 620 and the partial-frame chromatic data of the sensor data 601. The colorization module 630 may embody the colorization module 372. Each of the full-frame chromatic images of the colorization result corresponds to a respective chromatic channel of the color model employed by the hybrid sensor. The colorization module 630 may store the full-frame chromatic images in the buffer 646 as the colorization result. In some embodiments, in generating the full-frame chromatic images, the colorization module 630 may employ a substantially linear function (e.g., the function of Eq. (1)). That is, the colorization module 630 is configured to apply the partial-frame chromatic data of the each of the plurality of chromatic channels to the full-frame color-insensitive data through the linear function.

In some embodiments, the colorization module 630 may include the coefficient solver 632, which is configured to determine the coefficients of the linear function (e.g., the coefficients $a_k$ and $b_k$ of Eq. (1)) that would result in an optimal colorization result. In some embodiments, the coefficient solver 632 may determine the coefficients using an SSD solver based on Eq. (2), a guided filter solver, or a bilateral solver. The coefficients of the linear function may be stored in the coefficient buffer 632. In generating the full-frame chromatic images, the colorization module 630 may constantly fetch the coefficients from the coefficient buffer 632, as the coefficients remain the same for pixels within a certain neighborhood around a respective color scribble (e.g., the neighborhood $\Omega_k$ in FIG. 4, around the color scribble $U_j$).

In some embodiments, the apparatus 600 may include the output module 650. The output module 650 is configured to transmit the full-frame chromatic images stored in the buffer 646 as the full-frame color image 699. For example, the output module 650 may transmit the full-frame chromatic images of the chromatic channels to a display device that is configured to present the full-frame chromatic images as the full-frame color image 699.

IV. Illustrative Processes

Figure 7:
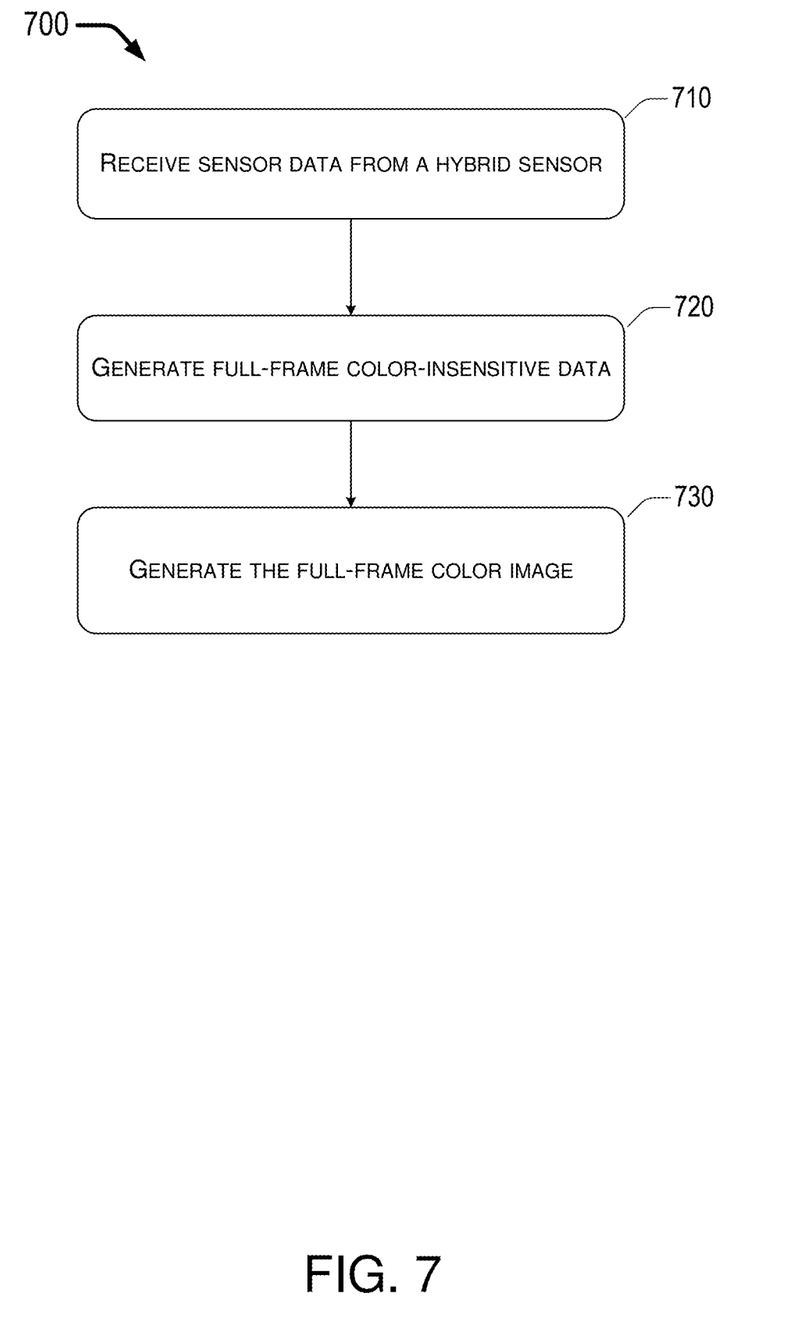
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to generating a full-frame color image based on sensor data from a hybrid sensor in accordance with the present disclosure. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in the apparatus 600 as well as any variations thereof. Solely for illustrative purposes and without limiting the scope, process 700 are described below in the context of the apparatus 600. Process 700 may begin at block 710.

At 710, process 700 may involve the input module 610 of the apparatus 600 receiving sensor data from a hybrid sensor. The hybrid sensor may employ a color model comprising a plurality of primary colors, from which all visible colors may be synthesized. The color model may be the RGB color model, the CMY color model, or other suitable color model able to generate a color space encompassing all visible colors. The sensor data may include partial-frame chromatic data of a plurality of chromatic channels of the color model (e.g., the partial-frame chromatic images 311, 312 and 313). The sensor data may also include partial-frame color-insensitive data (e.g., the color-insensitive data 320). The partial-frame color-insensitive data may correspond to a band of wavelength of white light. In some embodiments, the partial-frame color-insensitive data may correspond to a band of wavelength that further includes the near infrared (NIR) band, and even beyond the NIR band. The sensor data may be stored in the sensor data buffer 642 of the apparatus 600. In some embodiments, the partial-frame chromatic data is generated from chromatic sensing elements of the hybrid sensor, whereas the partial-frame color-insensitive data is generated from non-chromatic sensing elements of the hybrid sensor. The hybrid sensor may have a greater number of the non-chromatic sensing elements than the chromatic sensing elements. The hybrid sensor may include a sensor array embodied by the sensor array 100. Process 700 may proceed from 710 to 720.

At 720, process 700 may involve the spatial filtering module 620 generating full-frame color-insensitive data (e.g., the full-frame gray image 330) based on the partial-frame color-insensitive data of the sensor data received at 710. In some embodiments, the spatial filtering module 620 may generate the full-frame color-insensitive data by performing interpolation operations on the partial-frame color-insensitive data. In some embodiments, the spatial filtering module 620 may generate the full-frame color-insensitive data also based on the partial-frame chromatic data in addition to the partial-frame color-insensitive data. Process 700 may proceed from 720 to 730.

At 730, process 700 may involve the colorization module 630 performing a colorization process to generate a full-frame color image (e.g., the full-frame color image 340). The colorization process is performed based on the full-frame color-insensitive data (e.g., the full-frame gray image 330) and the partial-frame chromatic data (e.g., the partial-frame chromatic images 311, 312 and 313). The full-frame color image comprises a plurality of full-frame chromatic images (e.g., the full-frame chromatic images 341, 342 and 343). Each full-frame chromatic image corresponds to a respective chromatic channel of the color model employed by the hybrid sensor. Moreover, the colorization module 630 generates each full-frame chromatic image based on the full-frame color-insensitive data and the partial-frame chromatic data of the respective chromatic channel to which the full-frame chromatic image corresponds. In some embodiments, the colorization module 630 may perform the colorization process by applying the partial-frame chromatic data of the respective chromatic channel to the full-frame color-insensitive data through a substantially linear function. The colorization module 630 may solve for coefficients of the substantially linear function using the coefficient solver 632. The coefficient solver 632 may be a guided filter solver, a bilateral solver, or an SSD solver.

V. Illustrative Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 8:
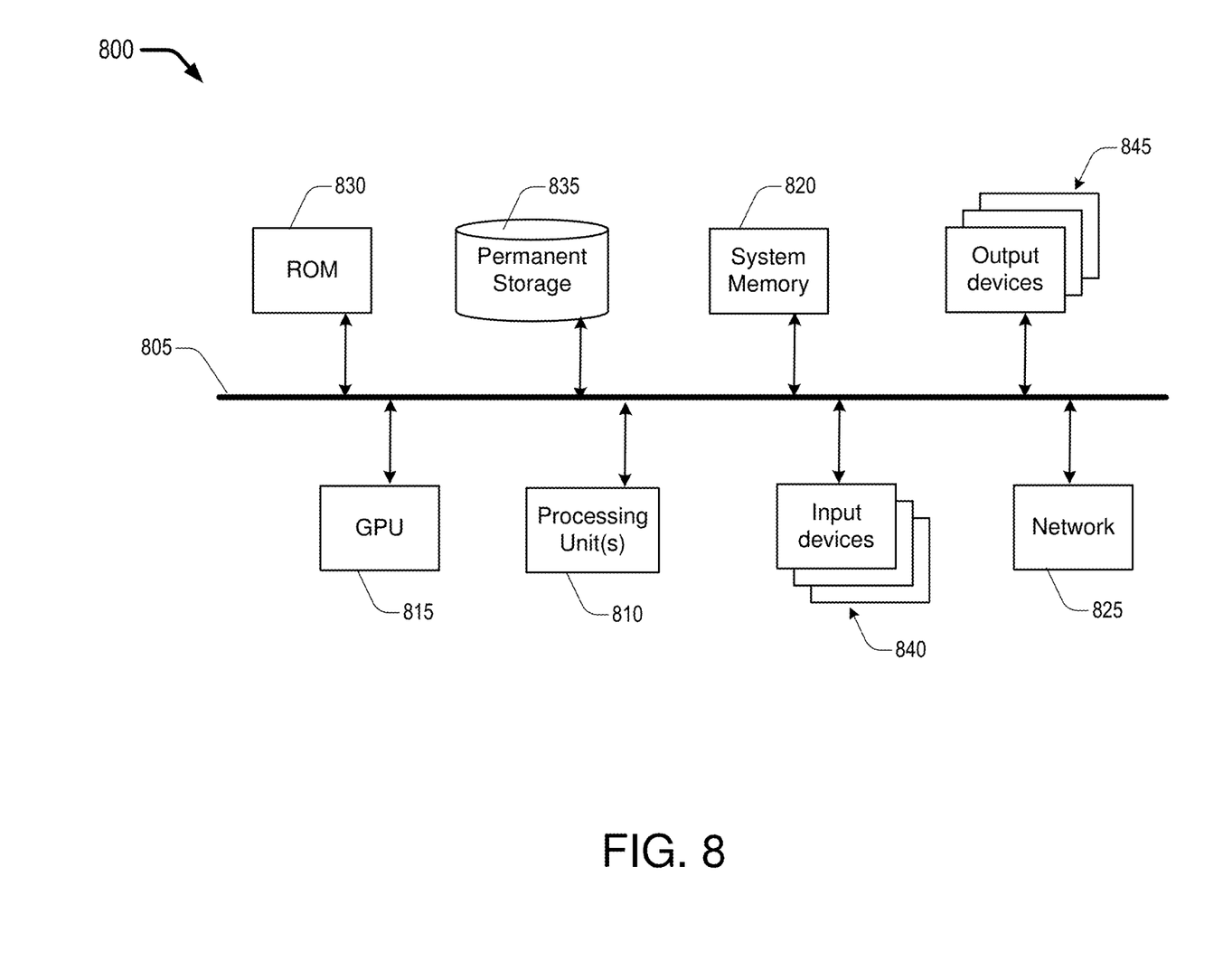
FIG. 8 is a diagram of an example electronic system in accordance with an implementation of the present disclosure.

FIG. 8 conceptually illustrates an electronic system 800 with which some embodiments of the present disclosure are implemented. The electronic system 800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 800 includes a bus 805, processing unit(s) 810, a graphics-processing unit (GPU) 815, a system memory 820, a network 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the GPU 815, the read-only memory 830, the system memory 820, and the permanent storage device 835.

From these various memory units, the processing unit(s) 810 retrieves instructions to execute and data to process in order to execute the processes of the present disclosure. The processing unit(s) may be a single processor or a multi-core processor in different embodiments. Some instructions are passed to and executed by the GPU 815. The GPU 815 can offload various computations or complement the image processing provided by the processing unit(s) 810.

The read-only-memory (ROM) 830 stores static data and instructions that are used by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the present disclosure use a mass-storage device (such as a magnetic or optical disk and its corresponding disk drive) as the permanent storage device 835.

Other embodiments use a removable storage device (such as a floppy disk, flash memory device, etc., and its corresponding disk drive) as the permanent storage device. Like the permanent storage device 835, the system memory 820 is a read-and-write memory device. However, unlike storage device 835, the system memory 820 is a volatile read-and-write memory, such a random access memory. The system memory 820 stores some of the instructions and data that the processor uses at runtime. In some embodiments, processes in accordance with the present disclosure are stored in the system memory 820, the permanent storage device 835, and/or the read-only memory 830. For example, the various memory units include instructions for processing multimedia clips in accordance with some embodiments. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals. While the present disclosure has been described with reference to numerous specific details, one of ordinary skill in the art will recognize that the present disclosure can be embodied in other specific forms without departing from the spirit of the present disclosure.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations.

Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of generating a full-frame color image, comprising:
   receiving sensor data from a hybrid sensor, the sensor data comprising partial-frame chromatic data of a plurality of chromatic channels and partial-frame color-insensitive data;
   generating full-frame color-insensitive data based on the partial-frame color-insensitive data; and
   generating the full-frame color image based on the full-frame color-insensitive data and the partial-frame chromatic data,
   wherein the full-frame color image comprises a plurality of full-frame chromatic images each corresponding to a respective one of the plurality of chromatic channels, and wherein the generating of the full-frame color image comprises generating each of the plurality of full-frame chromatic images using a colorization process based on the full-frame color-insensitive data and the partial-frame chromatic data of the respective chromatic channel.

2. The method of claim 1, wherein:
   the hybrid sensor comprises a sensor array having a plurality of chromatic sensing elements of a first quantity and a plurality of non-chromatic sensing elements of a second quantity greater than the first quantity, the plurality of chromatic sensing elements configured to generate the partial-frame chromatic data, the plurality of non-chromatic sensing elements configured to generate the partial-frame color-insensitive data, and
   the plurality of chromatic sensing elements are sparsely distributed among the plurality of non-chromatic sensing elements across a light-receiving surface of the sensor array.

3. The method of claim 1, wherein the generating of the full-frame color-insensitive data comprises interpolating the partial-frame color-insensitive data.

4. The method of claim 1, wherein the generating of the full-frame color-insensitive data is further based on the partial-frame chromatic data.

5. The method of claim 1, wherein the colorization process comprises applying the partial-frame chromatic data of the respective chromatic channel to the full-frame color-insensitive data through a substantially linear function.

6. The method of claim 5, wherein the colorization process further comprises determining one or more coefficients of the substantially linear function using a guided filter solver or a bilateral solver.

7. The method of claim 1, wherein the plurality of chromatic channels comprises a red channel, a green channel and a blue channel.

8. The method of claim 1, wherein the plurality of chromatic channels comprises a cyan channel, a magenta channel and a yellow channel.

9. The method of claim 1, wherein the partial-frame color-insensitive data comprises white light data, infrared data, or a combination of both.

10. An apparatus, comprising:
an input module configured to receive sensor data from a hybrid sensor, the sensor data comprising partial-frame chromatic data of a plurality of chromatic channels and partial-frame color-insensitive data;
a spatial filtering module configured to generate full-frame color-insensitive data based on the partial-frame color-insensitive data; and
a colorization module configured to generate a plurality of full-frame chromatic images based on the full-frame color-insensitive data and the partial-frame chromatic data, each of the plurality of full-frame chromatic images corresponding to a respective one of the plurality of chromatic channels,
wherein the colorization module is, in generating the plurality of full-frame chromatic images, further configured to apply the partial-frame chromatic data of the each of the plurality of chromatic channels to the full-frame color-insensitive data through a respective linear function.

11. The apparatus of claim 10, wherein:
the input module is further configured to receive the sensor data from a hybrid sensor,
the hybrid sensor comprises a sensor array having a plurality of chromatic sensing elements of a first quantity and a plurality of non-chromatic sensing elements of a second quantity greater than the first quantity, the plurality of chromatic sensing elements configured to generate the partial-frame chromatic data, the plurality of non-chromatic sensing elements configured to generate the partial-frame color-insensitive data, and
the plurality of chromatic sensing elements are sparsely distributed among the plurality of non-chromatic sensing elements across a light-receiving surface of the sensor array.

12. The apparatus of claim 10, wherein the spatial filtering module is configured to generate the full-frame color-insensitive data by performing interpolation on the partial-frame color-insensitive data.

13. The apparatus of claim 10, wherein the spatial filtering module is configured to generate the full-frame color-insensitive data further based on the partial-frame chromatic data.

14. The apparatus of claim 10, further comprising:
an output module configured to transmit the plurality of full-frame chromatic images as a full-frame color image.

15. The apparatus of claim 10, wherein the colorization module is further configured to determine one or more coefficients of the linear function using a guided filter solver or a bilateral solver.

16. The apparatus of claim 10, wherein the plurality of chromatic channels comprises a red channel, a green channel and a blue channel.

17. The apparatus of claim 10, wherein the plurality of chromatic channels comprises a cyan channel, a magenta channel and a yellow channel.

18. The apparatus of claim 10, wherein the partial-frame color-insensitive data comprises white light data, infrared data, or a combination of both.

* * * * *